(12) United States Patent
Boucher et al.

(10) Patent No.: US 8,925,716 B2
(45) Date of Patent: Jan. 6, 2015

(54) CONVEYOR LOCKING CLIP AND METHOD OF RELEASABLY INTERLOCKING CONVEYOR LOOP FASTENERS

(75) Inventors: Yves Boucher, St-Denis-de-Brompton (CA); Andre Corriveau, New Providence (BS); Richard Drapeau, St-Dominique (CA)

(73) Assignee: Lippert International, Inc., Nassau, New Providence (BS)

( * ) Notice: Subject to any disclaimer, the term of this patent is extended or adjusted under 35 U.S.C. 154(b) by 142 days.

(21) Appl. No.: 13/505,916

(22) PCT Filed: Nov. 3, 2010

(86) PCT No.: PCT/CA2010/001776
§ 371 (c)(1),
(2), (4) Date: May 3, 2012

(87) PCT Pub. No.: WO2011/054102
PCT Pub. Date: May 12, 2011

(65) Prior Publication Data
US 2012/0217139 A1 Aug. 30, 2012

Related U.S. Application Data

(60) Provisional application No. 61/280,454, filed on Nov. 4, 2009.

(51) Int. Cl.
*B65G 15/30* (2006.01)
*F16G 3/16* (2006.01)
*A44B 19/26* (2006.01)
*B65G 15/42* (2006.01)
*F16G 3/04* (2006.01)

(52) U.S. Cl.
CPC . *F16G 3/16* (2013.01); *A44B 19/26* (2013.01); *B65G 15/30* (2013.01); *B65G 15/42* (2013.01); *F16G 3/04* (2013.01)
USPC .................................................. 198/844.2

(58) Field of Classification Search
CPC ............... F16G 3/00; F16G 3/16; F16G 3/04; B65G 15/30; B65G 15/42
USPC ........................................................ 198/844.2
See application file for complete search history.

(56) References Cited

U.S. PATENT DOCUMENTS

| 1,895,345 | A | * | 1/1933 | Pink ................................. 245/10 |
| 3,070,864 | A | | 1/1963 | Pfeffer |
| 3,280,435 | A | | 10/1966 | Nasworthy |
| 3,731,365 | A | | 5/1973 | Fryatt |
| 3,791,509 | A | * | 2/1974 | Jones ......................... 198/464.1 |

(Continued)

FOREIGN PATENT DOCUMENTS

EP       0275656 A1    7/1988

*Primary Examiner* — Ramya Burgess
*Assistant Examiner* — Thomas Randazzo
(74) *Attorney, Agent, or Firm* — Fraser Clemens Martin & Miller LLC; James D. Miller

(57) ABSTRACT

The conveyor locking clip is used for releasably interlocking first and second conveyor loop fasteners and comprises first and second rigid arms for respective engagement in corresponding intermeshed loops of the first and second conveyor fasteners that are located at registering extremities of the first and second conveyor loop fasteners. A bridge rigidly linking the first and second arms.

12 Claims, 13 Drawing Sheets

(56) References Cited

U.S. PATENT DOCUMENTS

| | | |
|---|---|---|
| 4,451,957 A | 6/1984 | Lefferts et al. |
| 4,827,579 A * | 5/1989 | Gisbourne .................... 24/391 |
| 5,031,283 A * | 7/1991 | Aldrich ........................ 24/33 P |
| 5,467,865 A * | 11/1995 | Irwin ............................ 198/778 |
| 5,573,105 A * | 11/1996 | Palmaer ........................ 198/853 |
| 6,129,205 A * | 10/2000 | Ergenbright et al. ......... 198/852 |
| 6,478,704 B1 * | 11/2002 | Greiter ........................ 474/229 |
| 6,643,899 B2 * | 11/2003 | Corriveau et al. ........... 24/33 P |
| 7,028,833 B2 | 4/2006 | Halterbeck |
| 8,393,829 B2 * | 3/2013 | Taylor ......................... 405/262 |
| 8,490,272 B1 * | 7/2013 | Langsdorf et al. ............. 29/448 |

\* cited by examiner

CONVEYOR LOCKING CLIP AND METHOD OF RELEASABLY INTERLOCKING CONVEYOR LOOP FASTENERS

CROSS-REFERENCE DATA

This application claims the priority of U.S. provisional application No. 61/280,454 filed on Nov. 4, 2009.

FIELD OF THE INVENTION

The present invention relates to conveyor loop fasteners, and more particular to a conveyor locking clip and the method of releasably interlocking conveyor loop fasteners with a conveyor locking clip.

BACKGROUND OF THE INVENTION

Belt conveyors comprise an endless belt that is formed from an elongated band of flexible material such as rubber or other suitable fabric. To form the endless belt, an elongated belt is folded upon itself in a loop and the two conveyor belt extremity sections are attached to each other to form the endless belt that can be carried in rotation about a set of rollers. Conveyor loop fasteners are typically used to attach both conveyor belt extremity sections to each other. These conveyor loop fasteners comprise a number of loops linked to a respective one of the two conveyor belt extremity sections, along the registering attachment edges thereof.

The loops of the conveyor loop fasteners are typically interlinked to form a continuous helical band, i.e. each loop represents one turn of the continuous helical band. Alternately, each loop of the conveyor loop fasteners could be a band of rings individually attached to the conveyor belt extremity section. In any event, the loops may be attached either directly onto the conveyor belt or to a short length of flexible sheet fabric that is in turn attached to the conveyor belt itself.

To attach the conveyor belt extremity sections to each other, the loops of both conveyor loop fasteners are fastened through interdigitation engagement. That is to say, each loop of the first conveyor loop fastener is inserted in-between two loops of the second conveyor loop fastener, and vice versa; with the exception, of course, of one loop at each extremity of the two attached conveyor loop fasteners which is the outermost loop and consequently adjacent to a single other loop. Once the loops are thusly fastened through interdigitation engagement, a wire or pintle is passed longitudinally along and within both conveyor loop fasteners and more particularly within the intersecting portions of the loops of both conveyor loop fasteners. When the pintle is in place, the conveyor loop fasteners are interlocked and cannot disengage unless the pintle is removed. In some applications such as in the food and pharmaceutical industries, disassembling a conveyor is a daily business for cleaning purposes. Removing the pintle and reinserting a new one is tedious and time consuming. Indeed, the conveyor belt extremity sections are under considerable tension and significant friction exists when the pintle is forced through the intersecting conveyor loop fasteners. This friction is important enough that, in some cases, the heat generated by the friction will cause the plastic loops of the conveyor loop fasteners to melt.

Although it is possible to manually fasten the conveyor loop fasteners to each other, some fastening tools have been developed for this. Some of the tools however suffer from an important drawback: the tension between conveyor belt extremity sections needs to be reduced for the tools to be effective. This is often done by providing temporary attachments such as straps between the two conveyor belt extremity sections that allow the two conveyor belt extremity sections to be kept in close proximity while the conveyor loop fasteners are fastened. This method is disadvantageous in that it requires two attachment modes for the conveyor belt extremity sections: a first temporary attachment mode to reduce the tension in the conveyor belt and a second attachment mode can only be accomplished after the first attachment has been done.

The loops of some conveyor loop fasteners have a constant cross-section. Alternately, to increase the strength of the interlocking engagement between the conveyor loop fasteners, it is known to provide each fastening loop with a flat head portion located opposite its attachment to the conveyor belt extremity section to which it is attached. This may be done for example by heat-stamping the conveyor loop fastener to form this flattened head section.

The fastening of the two conveyor loop fasteners that have flattened loop head portions can be accomplished by arching each conveyor loop fastener so as to spread the loops of each conveyor loop fastener apart. The conveyor loop fasteners, usually forming a helical band, are usually semi-flexible, e.g. made of resilient plastic, to allow this yielding deformation to occur.

SUMMARY OF THE INVENTION

The present invention relates to a conveyor locking clip for releasably interlocking first and second conveyor loop fasteners, said locking clip comprising first and second rigid arms for respective engagement in corresponding intermeshed loops of said first and second conveyor fasteners that are located at registering extremities of said first and second conveyor loop fasteners, said locking clip further comprising a bridge rigidly linking said first and second arms.

In one embodiment, said bridge and said arms form a U-shaped locking clip.

In one embodiment, said bridge is arched.

In one embodiment, said conveyor locking clip further comprises studs on at least one of said first and second arms for engagement of said studs in-between loops of a corresponding one of said first and second conveyor loop fasteners.

In one embodiment, both said first and second arms are equipped with said studs for engagement of said studs in-between loops of a respective one of said first and second conveyor loop fasteners.

In one embodiment, said studs are equally spaced on each of said first and second arms, but are asymmetrically disposed on said first arm relative to those on said second arm.

The present invention also relates to a method of releasably interlocking first and second conveyor loop fasteners with a conveyor locking clip comprising first and second rigid arms and a bridge rigidly linking said first and second arms, each of said first and second conveyor loop fasteners comprising a number of loops linked to a respective one of first and second conveyor belt extremity sections, said method comprising:

fastening through interdigitation engagement the loops of said first and second loop fasteners;

releasably inserting said first arm of said locking clip in said loops of a first extremity of said first conveyor loop fastener and said second arm of said locking clip in said loops of a first extremity of said second conveyor loop fastener, with said first extremities of said first and second conveyor loop fasteners registering with each other;

wherein said first and second conveyor loop fasteners are releasably locked at said first extremities.

In one embodiment, the method for releasably interlocking said first and second conveyor loop fasteners is used with an additional locking clip comprising first and second rigid arms and a bridge rigidly linking said first and second arms, said method further comprising releasably inserting said first arm of said additional locking clip in said loops of a second extremity of said first conveyor loop fastener and said second arm of said additional locking clip in said loops of a second extremity of said second conveyor loop fastener, with said second extremities of said first and second conveyor loop fasteners registering with each other, wherein said first and second conveyor loop fasteners are releasably locked at said second extremities.

In one embodiment, the loops of said first and second conveyor loop fasteners are interlinked to form a continuous helical band.

In one embodiment, each loop of said first and second conveyor loop fasteners has a flat head portion located opposite an attachment edge of the conveyor belt extremity section to which said loop is attached, with the step of fastening through interdigitation engagement the loops of said first and second loop fasteners comprising inserting the flat head portions of loops of said first conveyor loop fastener between loops of said second conveyor loop fastener and inserting the flat head portions of loops of said second conveyor loop fastener between loops of said first conveyor loop fastener.

In one embodiment, the step of releasably inserting said first arm of said locking clip in said loops of said first extremity of said first conveyor loop fastener and said second arm of said locking clip in said loops of said first extremity of said second conveyor loop fastener comprises inserting said first arm of said locking clip between said flat head portions of said loops of said second conveyor loop fastener and said first conveyor belt extremity section and inserting said second arm of said locking clip between said flat head portions of said loops of said first conveyor loop fastener and said second conveyor belt extremity section.

In one embodiment, said first and second arms are equipped with studs and the step of releasably inserting said first arm of said locking clip in said loops of said first extremity of said first conveyor loop fastener and said second arm of said locking clip in said loops of said first extremity of said second conveyor loop fastener also comprises engaging said studs in-between loops of a corresponding one of said first and second conveyor loop fasteners.

In one embodiment, the step of releasably inserting said first arm of said locking clip in said loops of said first extremity of said first conveyor loop fastener and said second arm of said locking clip in said loops of said first extremity of said second conveyor loop fastener includes said bridge remaining outside of the loops of said first and second loop fasteners at said first extremities of said first and second conveyor loop fasteners.

In one embodiment, the loops of said first and second conveyor loop fasteners are rings individually attached to said conveyor belt extremity sections.

The present invention also relates to a conveyor fastening tool for use in fastening first and second conveyor loop fasteners to each other, each of the first and second conveyor loop fasteners of the type comprising a number of loops linked to a respective one of first and second conveyor belt extremity sections, said fastening tool comprising:

a main body;

a first channel formed in said main body for the passage therein of the first conveyor loop fastener between upstream and downstream ends along a first longitudinal axis;

a first lateral opening in said first channel for allowing the first conveyor belt extremity section to extend therethrough and to advance therethrough as the first conveyor loop fastener moves along said first channel;

a number of first loop retaining members mounted to said main body and peripherally spaced about said first channel, said first loop retaining members being oriented to limit movement orthogonally away from said first longitudinal axis for retaining said first conveyor loop fastener in said first channel including preventing movement of the first conveyor loop fastener out through said first lateral opening;

a second channel formed in said main body for the passage therein of the second conveyor loop fastener between said upstream and downstream ends along a second longitudinal axis;

a second lateral opening in said second channel for allowing the second conveyor belt extremity section to extend therethrough and to advance therethrough as the second conveyor loop fastener moves along said second channel;

a number of second loop retaining members mounted to said main body and peripherally spaced about said second channel, said second loop retaining members being oriented to limit movement orthogonally away from said second longitudinal axis for retaining said second conveyor loop fastener in said second channel including preventing movement of the second conveyor loop fastener out through said second lateral opening;

a third channel formed downstream of said first and second channels where said first and second channels merge; and opposed spaced-apart fastener closing members mounted to said main body for urging said first and second loop fasteners into interlocking engagement in said third channel, with said third channel defined between said fastener closing members.

In one embodiment, said first and second loop retaining members each comprise a loop retaining member located adjacent to said first and second lateral opening specifically for preventing the movement of the first and second conveyor loop fastener out through said first and second lateral openings, respectively.

In one embodiment, said first and second loop retaining members comprise first and second channel walls and opposed first and second rollers rotatably carried by said main body and located peripherally about said first and second channels, respectively, said first and second lateral openings being respectively defined between said first and second rollers and said first and second channel walls, said first and second rollers for preventing movement of said first and second conveyor loop fasteners out through said first and second lateral openings, respectively.

In one embodiment, said first and second rollers are disposed generally tangentially relative is to said first and second longitudinal axes, respectively, for rolling on the first and second conveyor belt extremity sections that extend through said first and second lateral openings while tangentially retaining said first and second conveyor loop fasteners within said first and second channels, respectively.

In one embodiment, said first and second rollers are disposed generally radially relative to said first and second longitudinal axes, respectively, for edgewisely rolling on the first and second conveyor loop fasteners while at least partly tangentially engaging said first and second conveyor belt extremity sections, respectively.

In one embodiment, wherein said first and second loop retaining members each comprise a pair of rollers spaced apart along said first and second longitudinal axes and disposed generally tangentially relative to said first and second longitudinal axes, respectively, for rolling on the first and second conveyor belt extremity sections that extend through said first and second lateral openings while tangentially retaining said first and second conveyor loop fasteners within said first and second channels, respectively.

In one embodiment, the position of said rollers of said first and second loop retaining members may be adjusted relative to said first and second longitudinal axes to increase the width of said first and second channels, respectively, for accommodating conveyor loop fasteners of different sizes.

In one embodiment, the position of said rollers of said first and second loop retaining members may be adjusted relative to said first and second channel walls to adjust the size of said first and second lateral openings, respectively, for accommodating conveyor belt extremity sections of different sizes.

In one embodiment, said rollers have shafts that are movably mounted to said main body to allow movement thereof in translation towards and away from corresponding said first and second channel walls, said fastening tool further comprising biasing means continuously biasing said rollers towards said corresponding first and second channel walls, for allowing the dimension of said first and second lateral openings to be increased by forcing said rollers away from said corresponding first and second channel walls against the bias of said biasing means, and decreased by allowing said rollers to move towards said corresponding channel walls under the bias of said biasing means.

In one embodiment, the conveyor fastening tool further comprises guide wheels carried by said main body and each positioned in edgewise register with regards to a corresponding roller opposite said first and second lateral openings, respectively, for allowing the first and second conveyor belt extremity sections to extend between said roller and said guide wheels and be guided therebetween.

In one embodiment, said first and second channels are offset in a direction that is perpendicular to a plane extending between said first channel and said first lateral opening and between said second channel and said second lateral opening and converge in superimposed fashion towards said third channel for fastening said first and second conveyor loop fasteners by applying one over the other orthogonally relative to said first and second conveyor belt extremity sections.

In one embodiment, said opposed fastener closing members comprise a pair of drums rotatably mounted to said main body.

In one embodiment, the relative position of said drums may be adjusted so as to allow the width of said third channel to be consequently adjusted for accommodating first and second conveyor loop fasteners of varying sizes.

In one embodiment, at least one drum has a shaft that is pivotally mounted to said main body for allowing the relative position of said drums to be adjusted.

DETAILED DESCRIPTION OF THE EMBODIMENTS

Figure 1:
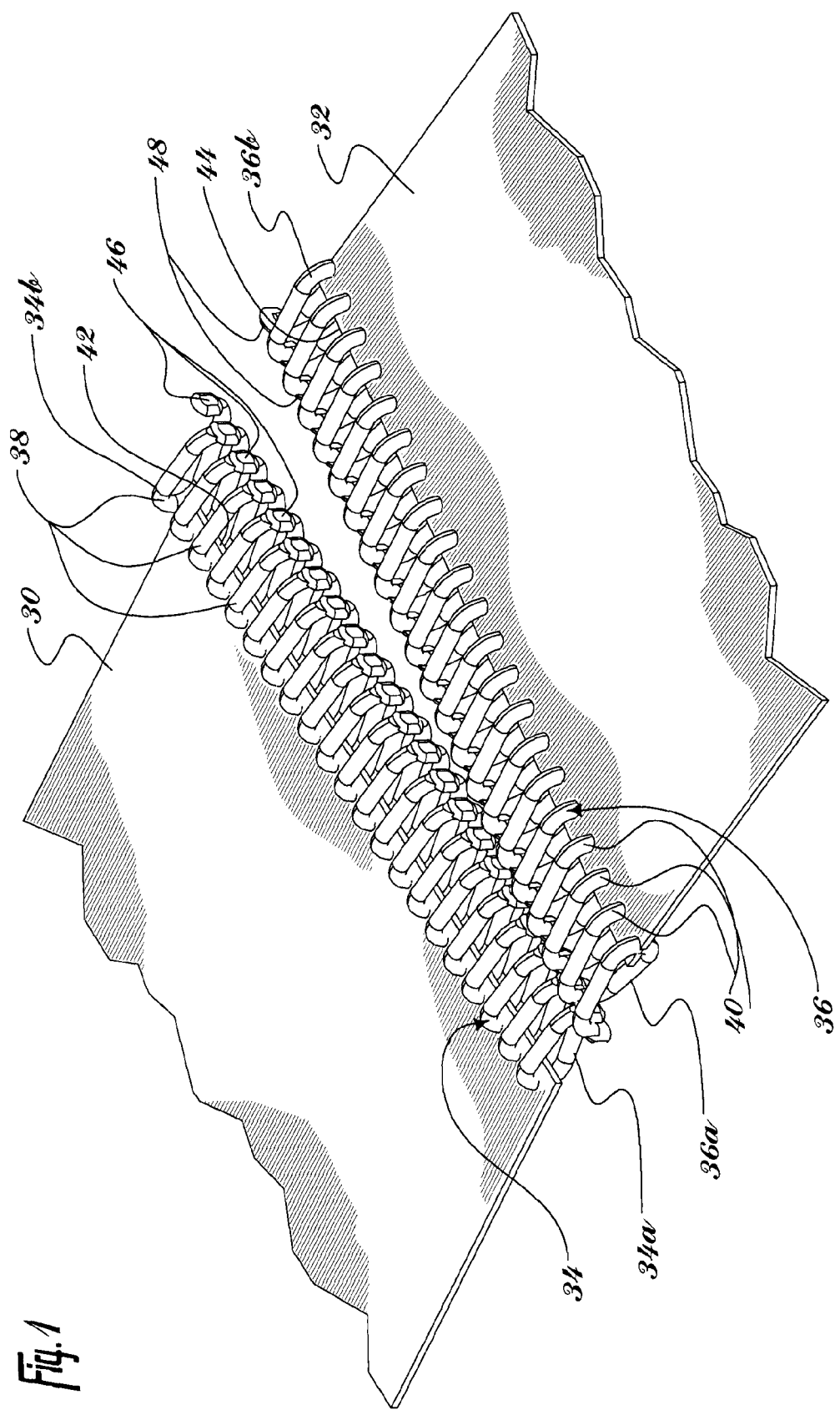
FIG. 1 is a perspective view of two conveyor belt extremity sections equipped with conveyor loop fasteners that are partly fastened to each other.

FIG. 1 shows two conveyor belt extremity sections 30, 32 that are to be releasably attached to each other to form an endless conveyor belt. To this end, first and second conveyor loop fasteners 34, 36 are provided that are each in the form of a helical band comprising a number of loops 38, 40, with each loop representing one turn of the helical band. Each helical conveyor loop fastener 34, 36 defines opposite first and second first extremities 34a, 34b and 36a, 36b and is threaded through holes made near a registering attachment edges 42, 44 of the conveyor belt extremity sections 30, 32. Each loop 38, 40 has a flat head portion 46, 48 located opposite its attachment to the conveyor belt extremity section 30, 32 to which it is attached. Flat head portions 46, 48 are wider in one plate and thinner in another plane than the otherwise generally constant cross-sectional area of the remaining portions of loops 38, 40.

To releasably attach the conveyor belt extremity sections 30, 32 to each other, the loops of both conveyor loop fasteners 34, 36 are fastened through interdigitation engagement. That is to say, each loop 38 of the first conveyor loop fastener 34 is inserted in-between two loops 40 of the second conveyor loop fastener 36, and vice versa. This is accomplished throughout the entire length of conveyor loop fasteners 34, 36, from their mutually registering first extremities 34*a*, 36*a* to their mutually registering second extremities 34*b*, 36*b*, as sequentially suggested in FIGS. 1 and 2. The releasable fastening of both conveyor loop fasteners 34, 36 may be accomplished manually or, more efficiently, with a fastening tool such as one of those shown in FIGS. 4-12 and 13-15 that will be detailed hereinafter.

Conveyor loop fasteners 34, 36 are made of a semi-flexible resilient memory material, such as a plastic material, to allow them to resiliently yieldingly deform while they are being attached but to spring back to their original uniform helical configuration when they are released, either when they are separated or fastened to each other. Indeed, during the attachment, conveyor loop fasteners 34, 36 may be arched to space each two successive head portions 46, 48 from each other, to allow the wider head portions 46, 48 of one conveyor loop fastener 34, 36 to be laterally inserted in-between the loops 38, 40 of the other conveyor loop fastener 34, 36. Alternately, the loops 38, 40 of one conveyor loop fastener 34, 36 may be inserted in-between the loops 38, 40 of the other conveyor loop fastener 34, 36 by positioning them one over the other, for example with the head portions 46 of the first conveyor loop fastener 34 overlying the loops 40 of the second conveyor loop fastener 36 midway between head portion 48 and the edge 44 of the second conveyor belt extremity section 32. Then, first conveyor loop fastener 34 will be forced downwardly against second conveyor loop fastener 36, one loop 38 at a time, from first extremity 34*a* to second extremity 34*b*, each loop head 46 of first conveyor loop fastener 34 forcing two loops 40 of second conveyor loop fastener 36 apart, and each loop head 48 of second conveyor loop fastener 36 forcing two loops of first conveyor loop fastener 34 apart, to allow all loops 38, 40 to be inserted between two loops of the opposite conveyor loop fastener 34 or 36, thus creating the interdigitation engagement of conveyor loop fasteners 34, 36.

Whether the conveyor loop fasteners are intermeshed laterally or in superimposed fashion, once the intermeshing is accomplished, the head portions 46 of first conveyor loop fastener 34 will be located in the longitudinal empty central area of the second conveyor loop fastener 36 where head portions 46 may fit without requiring the loops 40 to be spread-apart; and the head portions 48 of second conveyor loop fastener 36 will be located in the longitudinal empty central area of the first conveyor loop fastener 34 where head portions 48 may fit without requiring the loops 38 to be spread-apart. The pitch of the helical first and second conveyor loop fasteners 34, 36 is calculated to allow the loops 38, 40 to snugly fit between one another without however allowing the loop head portions 46, 48 to slide between two adjacent loops without spreading these two adjacent loops apart. Once engaged in-between loops 38, 40 that have sprung back in mutually parallel relationship, head portions 46, 48 will effectively allow the conveyor loop fasteners 34, 36 to be fastened in that the tension in conveyor belt extremity sections 30, 32 that forces them apart will be transmitted to the loop head portions 46, 48 that will each abut with their edges against the edges of the adjacent head portions 46 or 48 of the other conveyor loop fastener 34 or 36, thereby preventing separation of the conveyor belt extremity sections 30, 32.

Of course, at each extremity 34*a*, 36*a* and 34*b*, 36*b*, one loop 38 or 40 of one of the first or second conveyor loop fastener 34 or 36 will not be located in-between two loops of the other conveyor loop fastener, since it will be the outermost loop 38 or 40. This could allow the fastened conveyor loop fasteners 34, 36 to accidentally disengage from each other if this outermost loop 38, 40 is allowed to resiliently deform outwardly away from the adjacent loop 38, 40; indeed, the next loop 38 or 40 could then also be allowed to deform away from its adjacent loop 38 or 40, then the next, and so on, until the entire loop fasteners 34, 36 have undesirably released each other.

It has been mentioned in the Background of the Invention section that the prior art conveyor loop fasteners would use a wire or pintle to avoid this problem.

Figure 2:
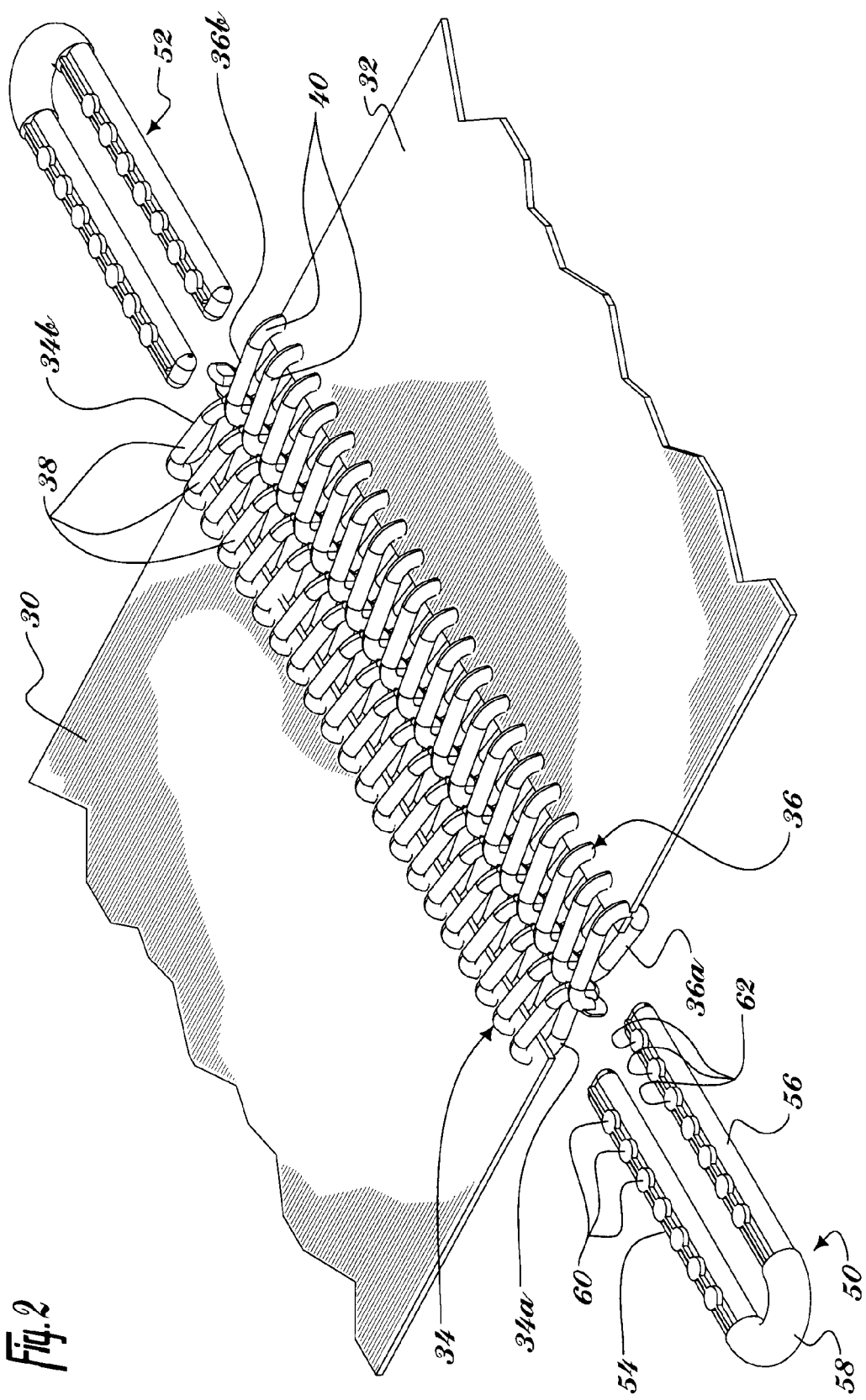
FIG. 2 is a view similar to FIG. 1 but with the conveyor loop fasteners being entirely fastened to each other and further showing a pair of conveyor locking clips ready to be inserted into the conveyor loop fasteners.
Figure 3:
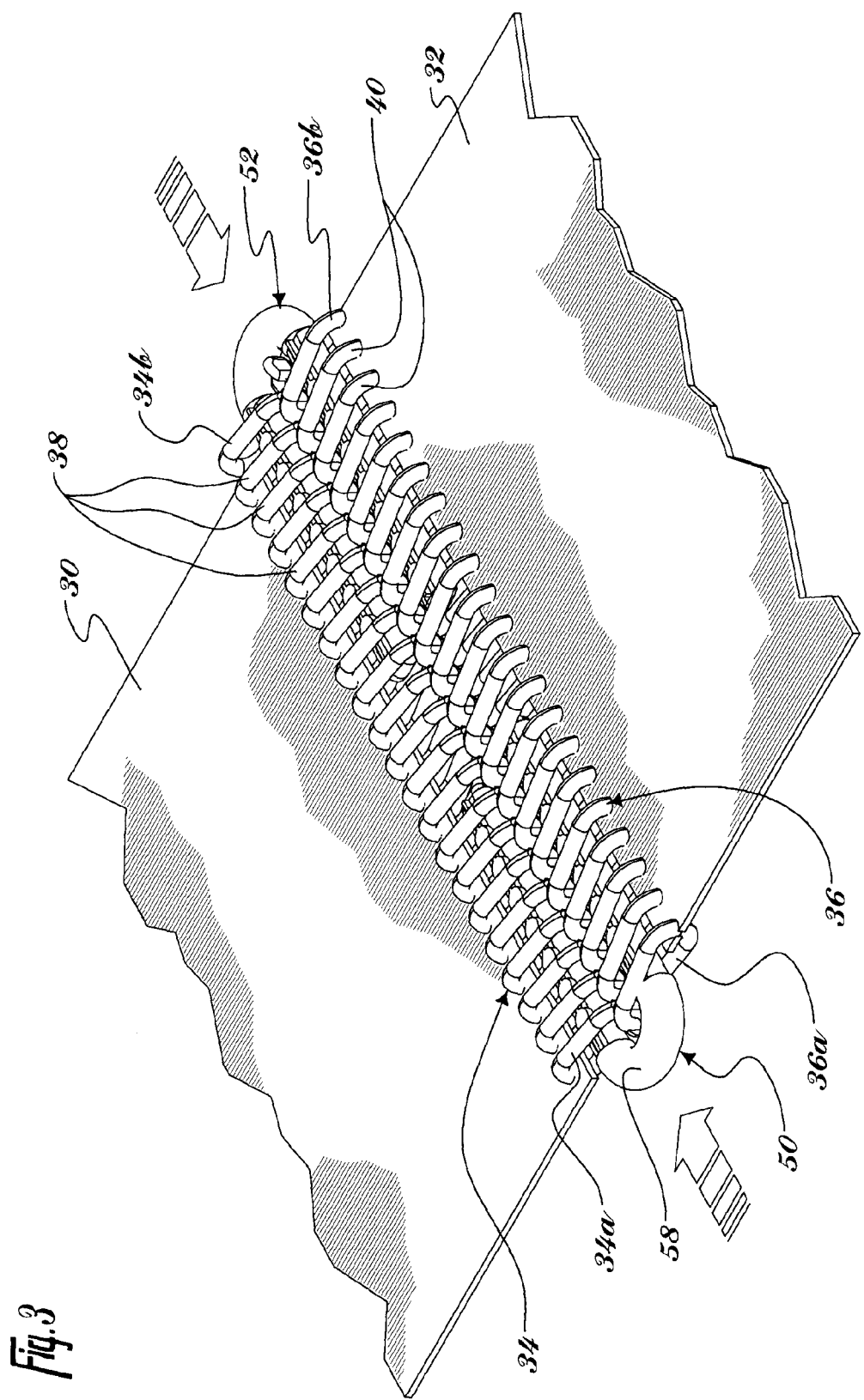
FIG. 3 is a view similar to FIG. 2 but with the conveyor locking clips operatively inserted into the conveyor loop fasteners.
Figure 4:
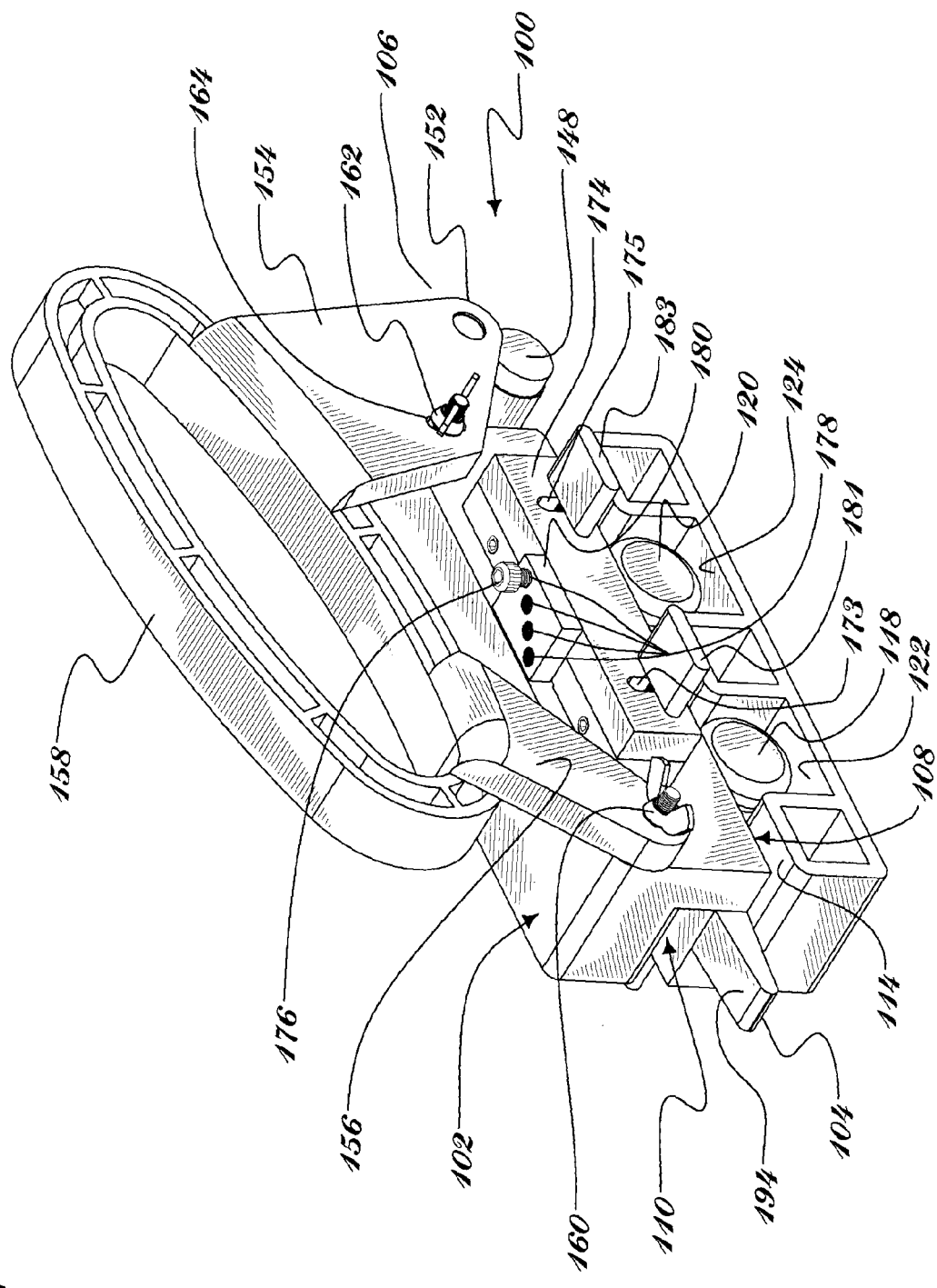
FIG. 4 is perspective view taken from the front, top and left side of a conveyor fastening tool according to a first embodiment of the invention.
Figure 5:
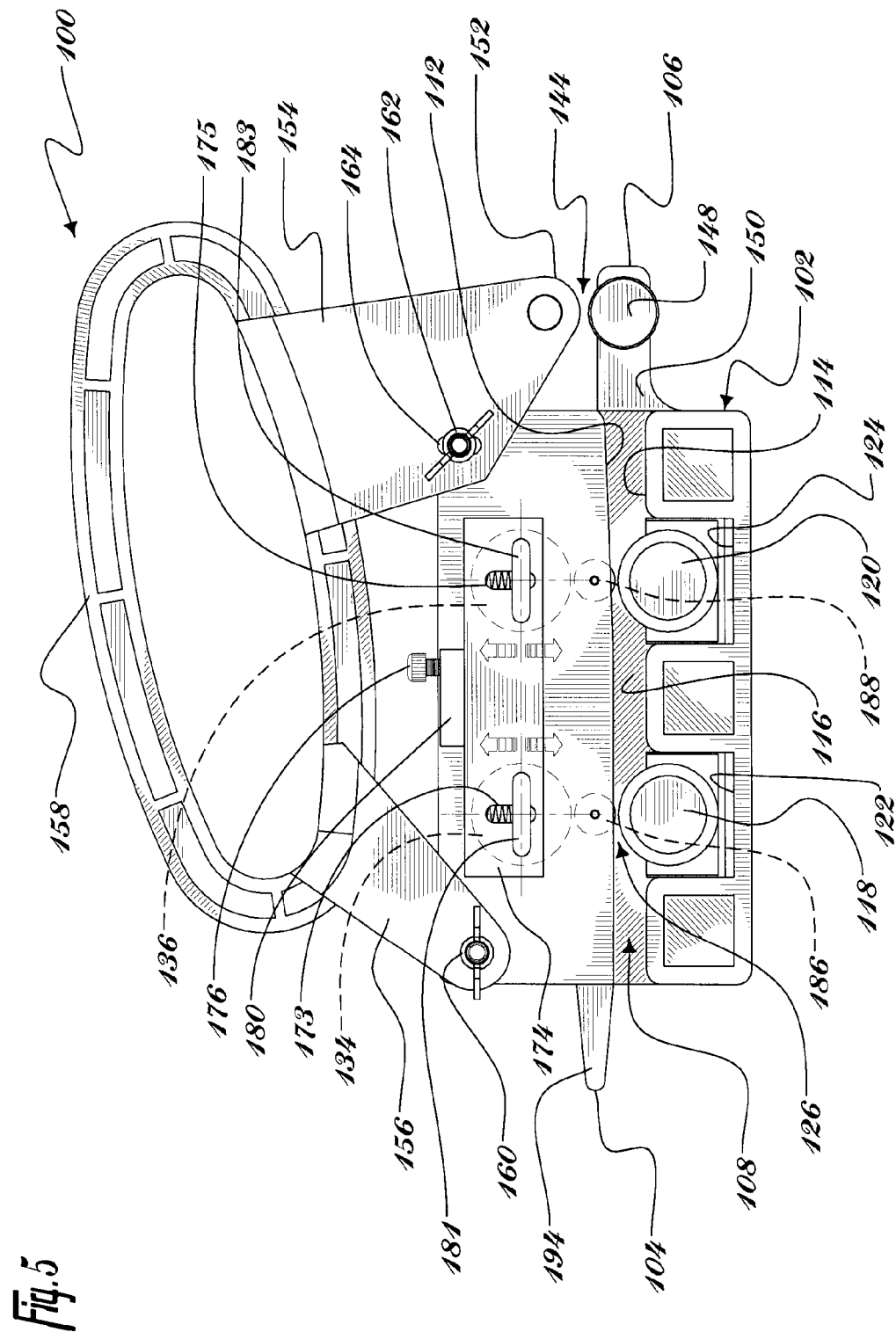
FIG. 5 is a left-side elevation of the conveyor fastening tool of FIG. 4.
Figure 6:
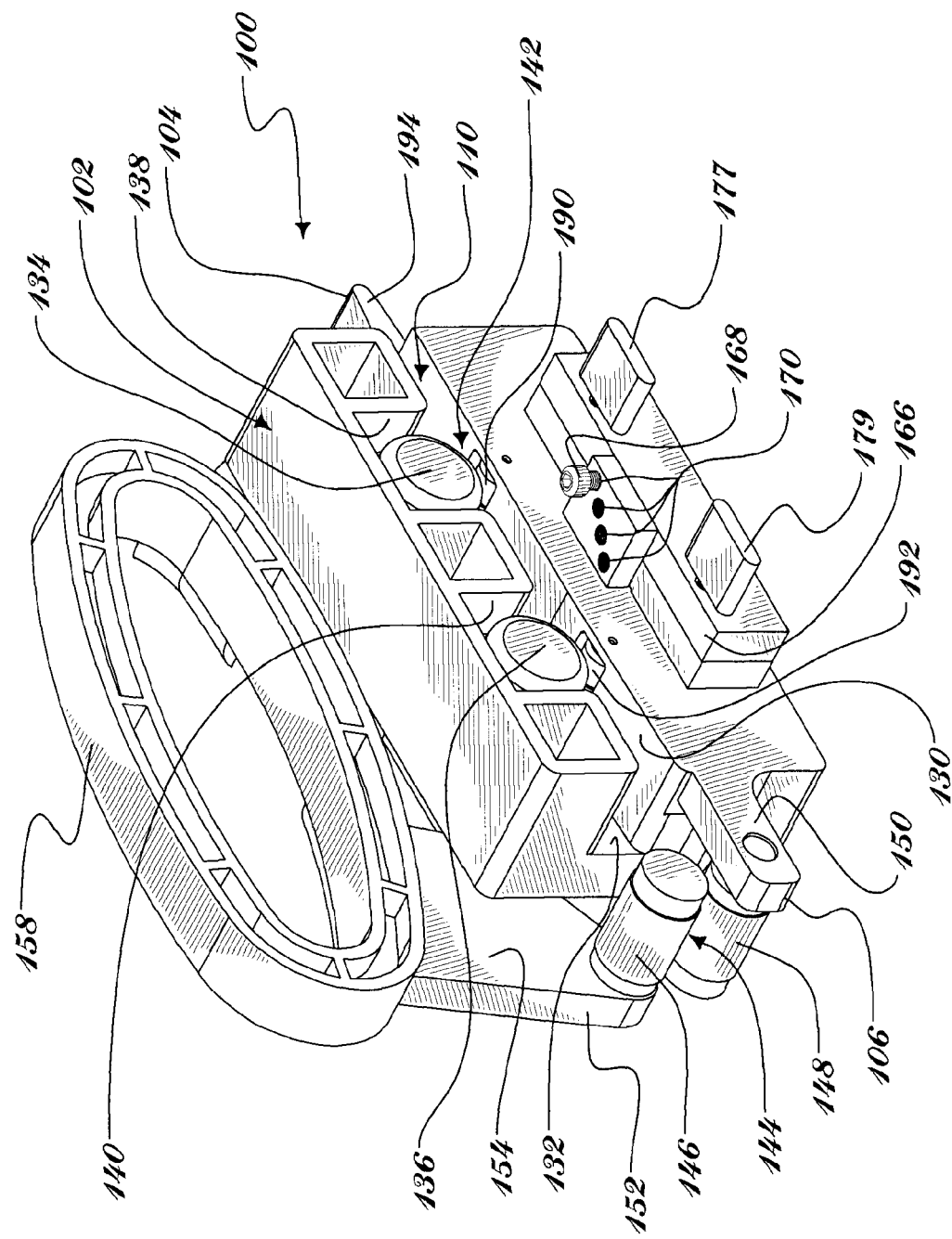
FIG. 6 is perspective view taken from the rear, top and right side of the conveyor fastening tool of FIG. 4.
Figure 7:
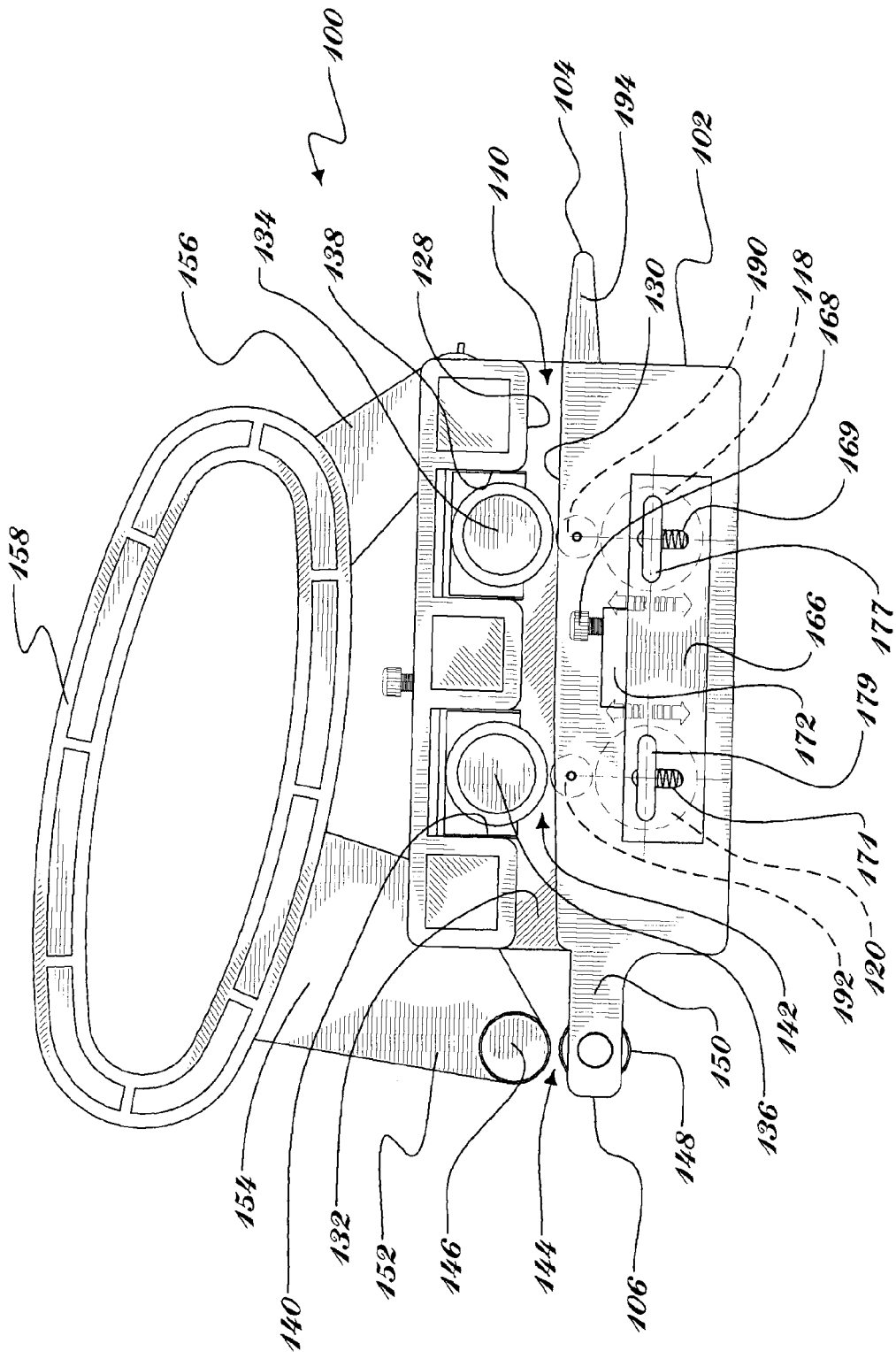
FIG. 7 is a right-side elevation of the conveyor fastening tool of FIG. 4.
Figure 8:
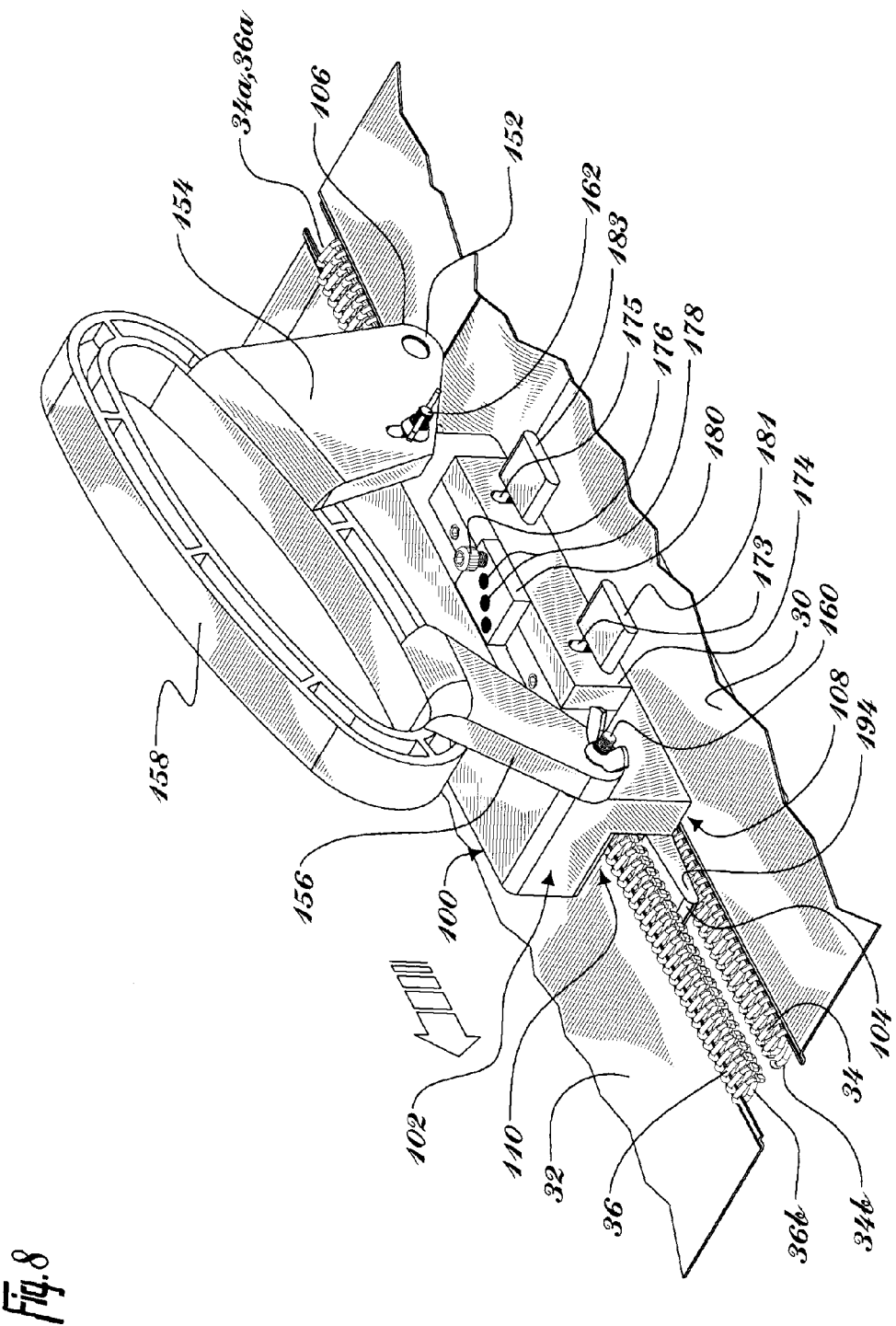
FIG. 8 is perspective view taken from the front, top and left side of two conveyor belt extremity sections equipped with conveyor loop fasteners that are being fastened by the conveyor fastening tool of FIG. 4.
Figure 9:
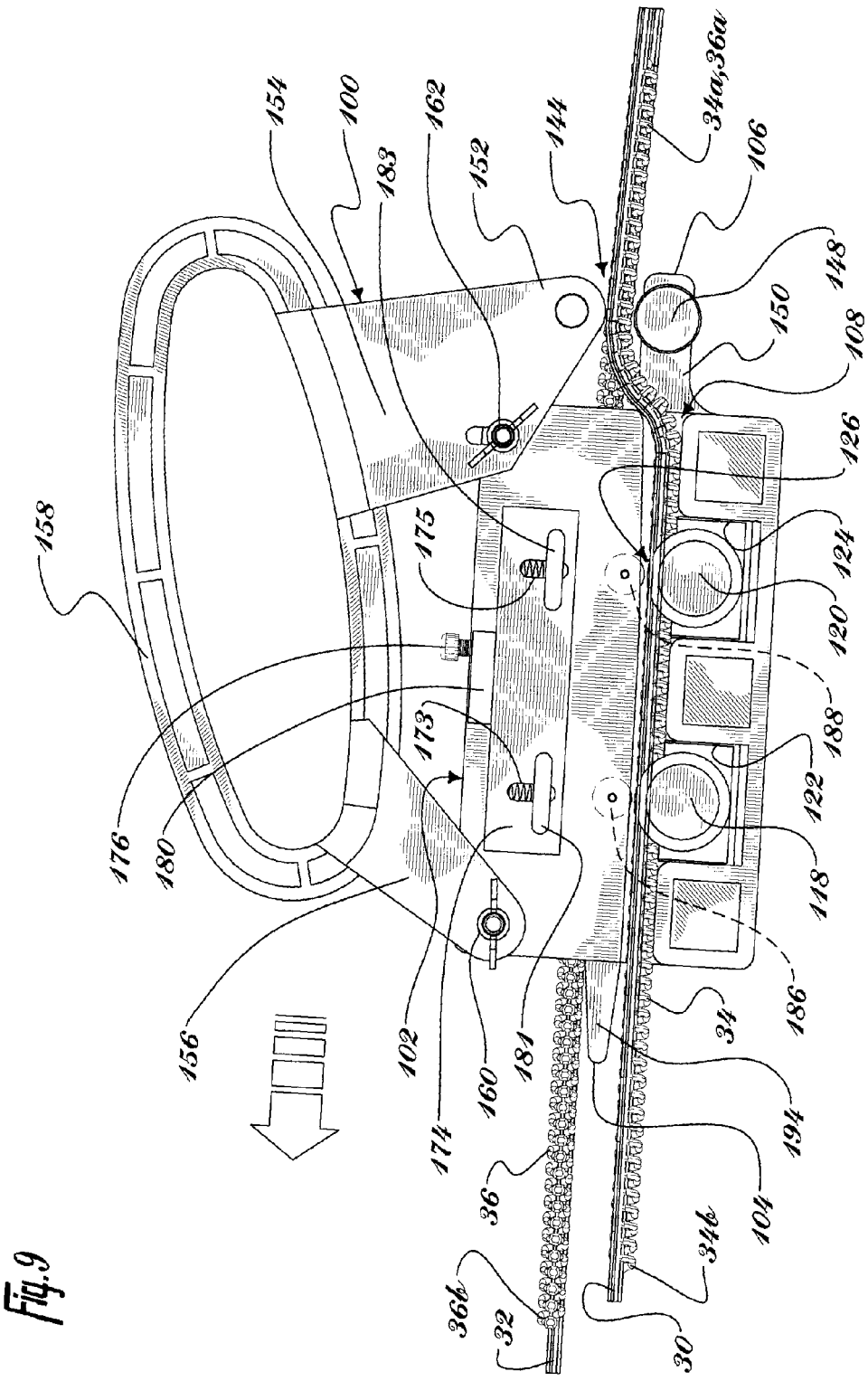
FIG. 9 is a left-side elevation of the two conveyor belt extremity sections equipped with conveyor loop fasteners that are being fastened by the conveyor fastening tool of FIG. 4.
Figure 10:
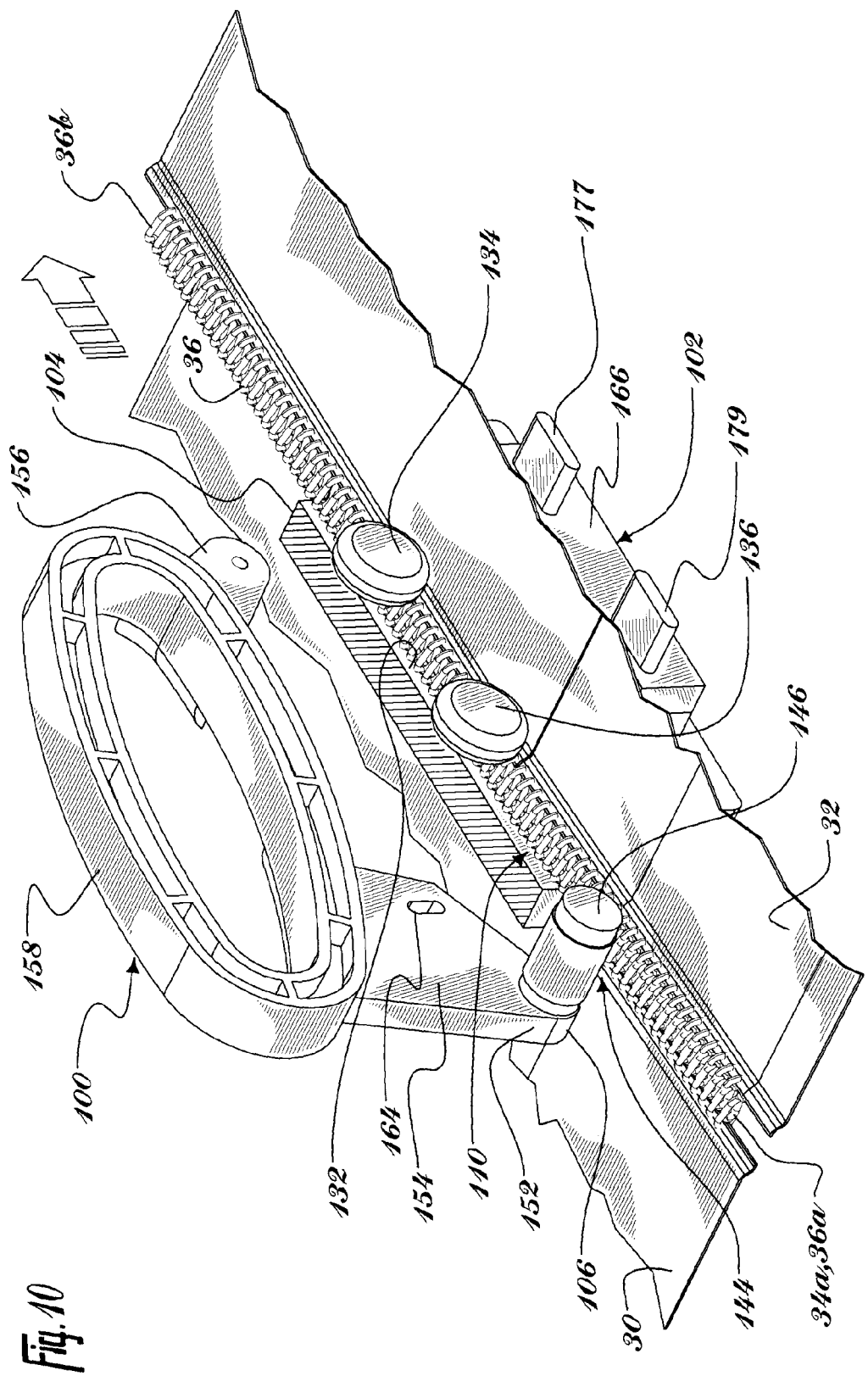
FIG. 10 is perspective view taken from the rear, top and right side of the two conveyor belt extremity sections equipped with conveyor loop fasteners that are being fastened by the conveyor fastening tool of FIG. 4, with part of the fastening tool main body being removed.
Figure 11:
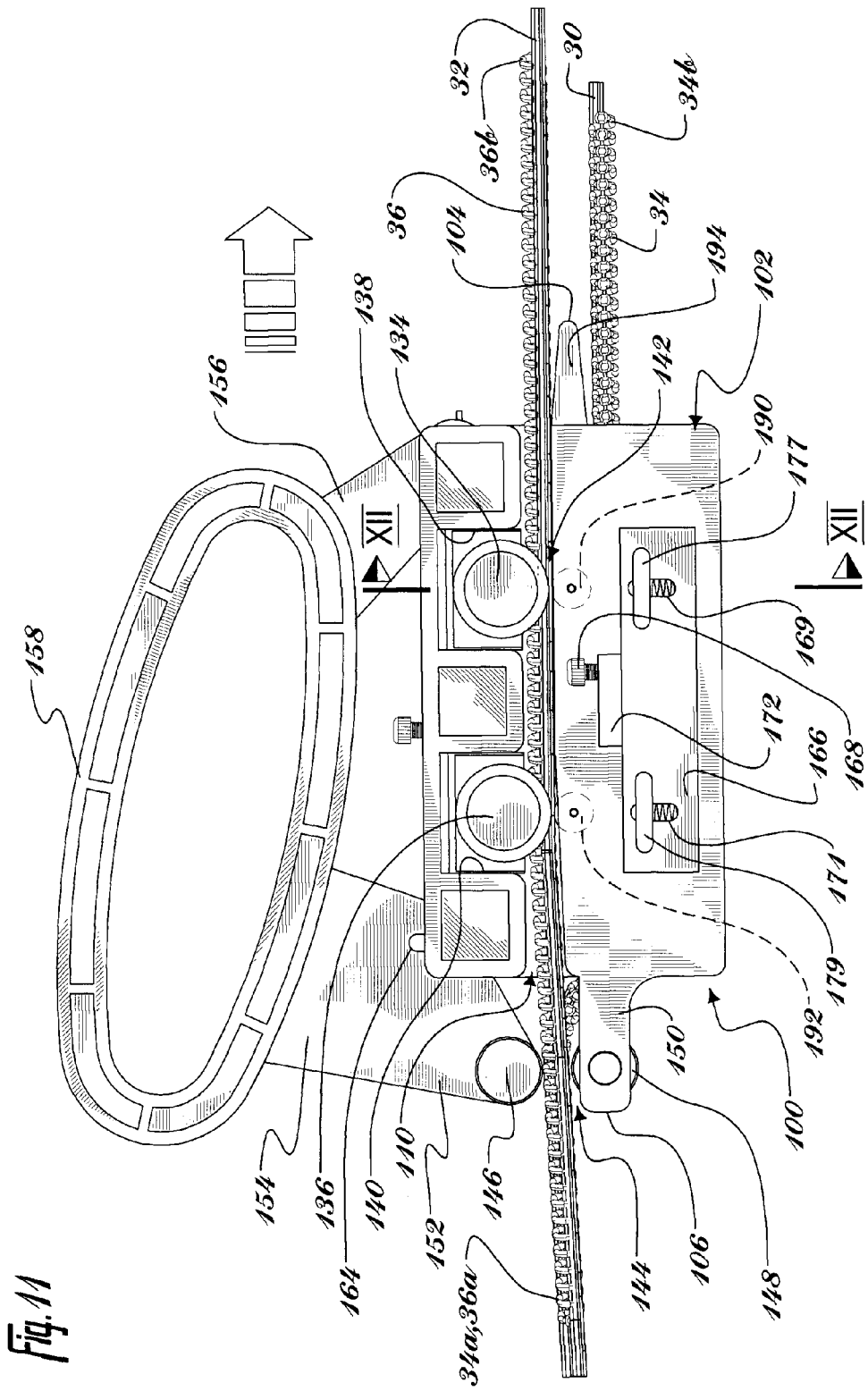
FIG. 11 is a right-side elevation of the two conveyor belt extremity sections equipped with conveyor loop fasteners that are being fastened by the conveyor fastening tool of FIG. 4.
Figure 12:
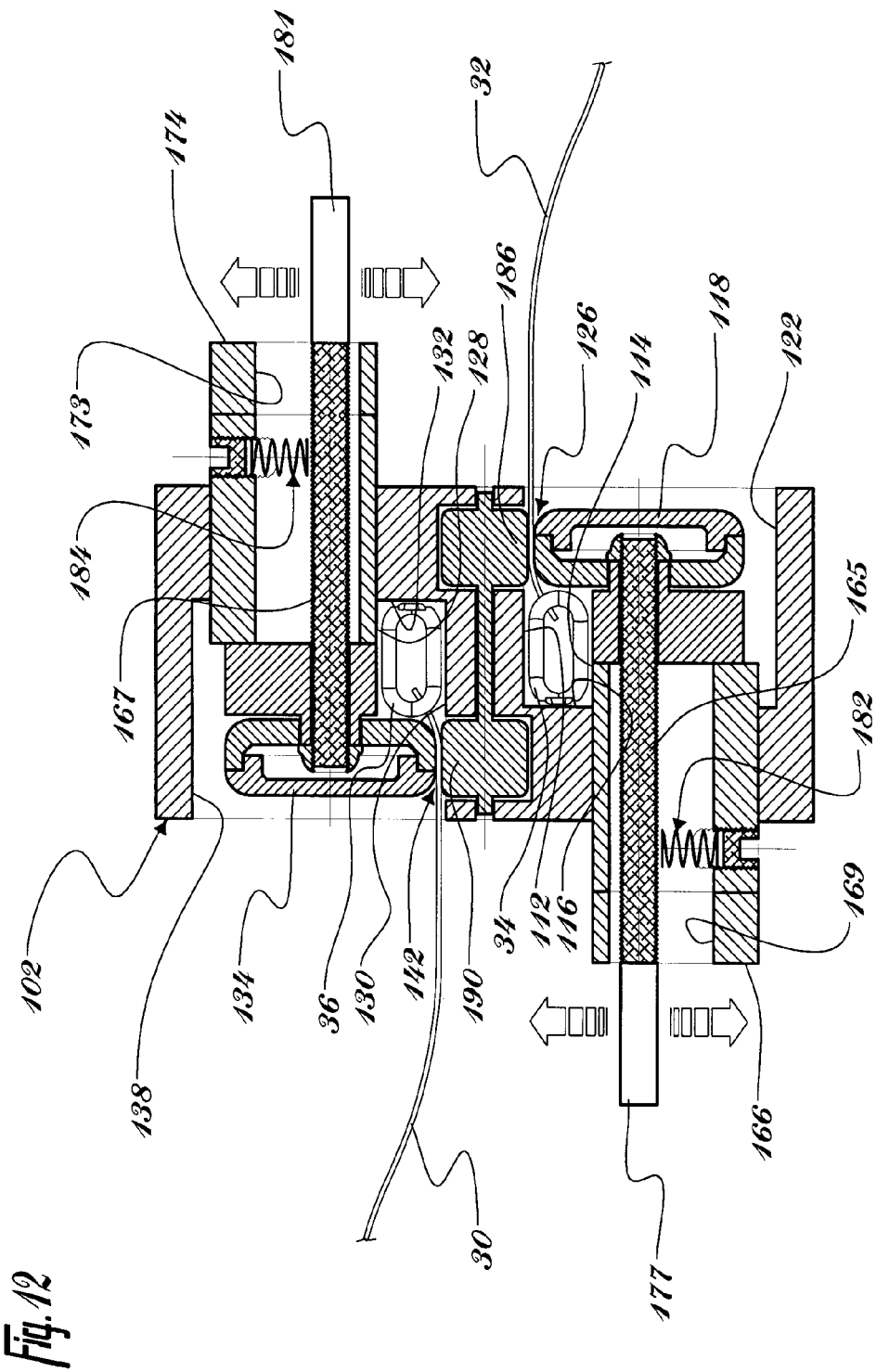
FIG. 12 is a cross-sectional view, at an enlarged scale, taken along line XII-XII in FIG. 11, with the handle being excluded.

According to the present invention, and as shown in FIGS. 2 and 3, a conveyor locking clip 50 has been invented for releasably interlocking the first and second conveyor loop fasteners 34, 36 to each other without use of a wire or pintle.

Conveyor locking clip 50 comprises first and second rigid arms 54, 56 and an arched bridge 58 rigidly linking first and second arms 54, 56 whereby bridge 58 and arms 54, 56 form a U-shaped locking clip 50. Locking clip 50 further comprises studs 60, 62 that protrude on at least one of first and second arms 54, 56. In the embodiment shown in the drawings, both first and second arms 54, 56 are equipped with studs 60, 62. Studs 60, 62 are equally spaced on each of first and second arms 54, 56, but are asymmetrically disposed on first arm 54 relative to those on second arm 56. Locking clip 50 may be made of plastic or other suitable material; and could also include an inner reinforcement (not shown) to desirably increase its resistance to bending.

In use, after conveyor loop fasteners 34, 36 are mutually attached to each other as described hereinabove, arms 54, 56 of conveyor locking clip 50 are releasably inserted into the first few corresponding loops 38, 40 of first and second conveyor fasteners 34, 36 that are located at the registering first extremities 34*a*, 36*a* of first and second conveyor loop fasteners 34, 36, as shown in FIG. 3. More particularly, first arm 54 is inserted in the central area of loops 38 between the heads 48 of the second conveyor loops 40 and the attachment edge 42 of the first conveyor belt extremity section 30; and second arm 56 is inserted in the central area of loops 40 between the heads 46 of the first conveyor loops 38 and the attachment edge 44 of the second conveyor belt extremity section 32. Studs 60, 62 will snap in-between loops 38, 40 of the corresponding one of first and second conveyor loop fasteners 34, 36 they are inserted in, to help prevent accidental disengagement of locking clip 50 from conveyor loop fasteners 34, 36. Studs 60 are asymmetrically disposed relative to studs 62 since the loops 38, 40 of helical conveyor loop fasteners 34, 36 are longitudinally offset relative to each other due to their intermeshing engagement.

Removal of locking clip 50 may be accomplished by simply pulling on it with sufficient force to counter the friction between locking clip 50 and conveyor loop fasteners 34, 36 and to counter the resistance offered by studs 60, 62 that are partly engaged in-between loops 38, 40 and that need to slightly resiliently deform the latter to be released.

A second conveyor locking clip 52 is installed at the second extremity 34*b*, 36*b* of conveyor loop fasteners 34, 36, which is identical to the first locking clip 50, to releasably interlock the second extremity 34*b*, 36*b* of conveyor loop fasteners 34, 36.

The present invention also relates to a method of releasably interlocking first and second conveyor loop fasteners 34, 36 with conveyor locking clip 50, comprising:

fastening through interdigitation engagement the loops 38, 40 of first and second loop fasteners 34, 36; and releasably inserting the first arm 54 of locking clip 50 in loops 38 at the first extremity 34*a* of first conveyor loop fastener 34 and second arm 56 of locking clip 50 in loops 40 at first extremity 36*a* of second conveyor loop fastener 36;

wherein first and second conveyor loop fasteners 34, 36 are releasably locked at first extremities 34a, 36a.

The same method may be repeated at the second extremities 34b, 36b of conveyor loop fasteners 34, 36.

Interlocking the extremities 34a, 34b, 36a, 36b of conveyor loop fasteners 34, 36 prevents the outermost loops 38, 40 from resiliently deforming away from the adjacent loops 38, 40 thus gradually allowing the other loops from disengaging each other. With the loops 38, 40 otherwise being fastened due to the inter-abutment of the loop head portions 46, 48, the conveyor loop fasteners 34, 36 are effectively prevented from accidental disengagement with locking clips 50, 52.

The locking clip 50 and the method of releasably interlocking first and second conveyor loop fasteners 34, 36 with conveyor locking clip 50 are very advantageous over the wire or pintle, due to the high simplicity of installation. Indeed, while the wire or pintle would need to be inserted through the entire length of the first and second conveyor loop fasteners 34, 36, the locking clip only needs to be installed at the end sections thereof. This significantly simplifies the installation and removal of the conveyor belt in all circumstances. Not only does it save a lot of time, but also it helps prevent the conveyor loop fasteners from being damaged during installation and removal procedures.

It is noted that although the loops 38, 40 have been shown and described herein to form helical bands, the loops of first and second conveyor loop fasteners 34, 36 could alternately be rings individually attached to a corresponding one of the first and second conveyor belt extremity sections, with only minor modifications to the present invention. It should be noted that these rings might have to be fixed to the conveyor belt extremity sections to ensure that the ring head portions remain at a desired position opposite the attachment edge of the conveyor belt extremity section.

FIGS. 4-12 show a conveyor fastening tool 100 for use in fastening first and second conveyor loop fasteners 34, 36 to each other. After the conveyor loop fasteners 34, 36 have been fastened, suitable locking means should be used to prevent accidental disengagement of the fastened conveyor loop fasteners 34, 36, such as locking clips 50, 52 or alternately a wire or pintle. Furthermore, although FIGS. 8-12 show the fastening tool 100 being used to fasten helical conveyor loop fasteners 34, 36 equipped with flattened head portions, it should be noted that fastening tool 100 could be used to fasten other types of conveyor loop fasteners such as helical conveyor loop fasteners with loops having a constant cross-section (i.e. no flattened head portion) in which case a pintle becomes necessary, or conveyor loop fasteners having independent rings instead of a helical loop band.

Conveyor fastening tool 100 comprises a main body 102 defining an upstream end 104 and a downstream end 106. A first channel 108 is formed in main body 102 for the passage therein of the first conveyor loop fastener 34 between upstream and downstream ends 104, 106 along a first longitudinal axis that extends through first channel 108. A second channel 110 is formed in main body 102 for the passage therein of the second conveyor loop fastener 36 between upstream and downstream ends 104, 106 along a second longitudinal axis that extends through second channel 110.

A number of first loop retaining members are mounted to main body 102 and are peripherally spaced about first channel 108 to circumscribe it. More particularly, the first loop retaining members comprise an upper wall 112, a lower wall 114 and a side wall 116 that all integrally form part of main body 102; and a pair of rollers 118, 120 that are rotatably mounted to main body 102 in cavities 122, 124 sized for this purpose. A first lateral opening 126 in first channel 108 allows first conveyor belt extremity section 30 to extend outwardly of channel 108 and to advance along with first conveyor loop fastener 34 as it moves along and within first channel 108. First lateral opening 126 is defined between the first channel rollers 118, 120 and first channel upper wall 112 (and also between first channel rollers 118, 120 and first channel guide wheels 186, 188 as detailed hereinafter).

A number of second loop retaining members are mounted to main body 102 and are peripherally spaced about second channel 110 to circumscribe it. More particularly, the second loop retaining members comprise an upper wall 128, a lower wall 130 and a side wall 132 that all integrally form part of main body 102; and a pair of rollers 134, 136 that are rotatably mounted to main body 102 in cavities 138, 140 sized for this purpose. A second lateral opening 142 in second channel 110 allows second conveyor belt extremity section 32 to extend outwardly of second channel 110 and to advance along with second conveyor loop fastener 36 as it moves along and within second channel 110. Second lateral opening 142 is defined between second channel rollers 134, 136 and second channel lower wall 130 (and between the second channel rollers 134, 136 and the second channel guide wheels 190, 192 as detailed hereinafter).

The first loop retaining members, namely first channel upper wall 112, lower wall 114, side wall 116 and first channel rollers 118, 120, are oriented to limit movement orthogonally away from said first longitudinal axis for retaining first conveyor loop fastener 34 in first channel 108 including preventing the movement of first conveyor loop fastener 34 out through first lateral opening 126.

The second loop retaining members, namely second channel upper wall 128, lower wall 130, side wall 132 and second channel rollers 134, 136, are oriented to limit movement orthogonally away from said second longitudinal axis for retaining second conveyor loop fastener 36 in second channel 110 including preventing the movement of second conveyor loop fastener 36 out through second lateral opening 142.

The first and second loop retaining members consequently prevent movement of first and second conveyor loop fasteners 34, 36 orthogonally away from the first and second channels while still allowing the conveyor belt extremity sections to extend through first and second lateral openings 126, 142.

Fastening tool 100 also comprises a third channel 144 formed downstream of first and second channels 108, 100, at downstream end 106 of fastening tool 100, where first and second channels 108, 110 merge and converge. The first channel upper wall 112 and the second channel lower wall 130 indeed slope in a convergent fashion to allow first and second conveyor loop fasteners 34, 36 to be guided towards one another. Fastening tool 100 comprises opposed spaced-apart fastener closing members in the form of upper and lower drums 146, 148 rotatably mounted to main body 102 for urging first and second loop fasteners 34, 36 into interlocking engagement in third channel 144, with third channel 144 defined between drums 146, 148. Third channel 144 does not include any main body wall portions to circumscribe it as do the first and second channels 108, 110.

Lower drum 148 is rotatably mounted to a lower drum support tongue 150 that forms an integral part of main body 102 at downstream end 106, while upper drum 146 is rotatably mounted to an upper drum support tongue 152 that forms an integral part of and downwardly depends from a handle rear support plate 154 which is attached to main body 102 at downstream end 106. A handle front support plate 156 is attached to main body 102 at upstream end 104 and both handle front and rear support plates 156, 154 carry a handle 158. The attachment screw 160 of handle front support plate 156 to main body 102 allows handle 158 to pivot about attachment screw 160 whereby the so relative position of drums 146, 148 can be adjusted. More particularly, by pivoting handle 158 about its front attachment screw 160, the upper drum 146 may be moved towards or away from lower drum 148 so as to allow the thickness of third channel 144 to be consequently adjusted for accommodating first and second conveyor loop fasteners 34, 36 of varying sizes. Once the desired spacing between drums 146, 148 is obtained, a rear attachment screw 162 is used to set the position of handle 158 relative to main body 102, and consequently of upper drum 146 relative to lower drum 148. Rear attachment screw 162 extends through a slot 164 made in handle rear support plate 154 to allow the latter to move as handle 158 pivots about front attachment screw 160. Once the desired position of handle 158 is obtained, a wing nut is tightened on screw 162 to set the position of handle 158. A wing nut on front attachment screw 160 can optionally be tightened also. If, later, a new thickness is desired for third channel 144, the wing nuts can be loosened and the spacing between drums 146, 148 may be adjusted again, such as if fastening tool 100 is to be used to fasten another conveyor belt having conveyor loop fasteners 34, 36 of a different size.

The position of rollers 118, 120 and of rollers 134, 136 may be adjusted relative to that of the first and second longitudinal axes to increase the width of first and second channels 108, 110, respectively, for accommodating conveyor loop fasteners 34, 36 of different sizes. More particularly, first channel rollers 118, 120 are mounted to main body 102 by means of a first roller mounting block 166 that is slidable within main body 102 in a direction parallel to that of the shafts 165 (FIG. 12) of rollers 118, 120. A set screw 168 that extends through a selected hole 170 of an adjustment plate 172 fixed to main body 102 allows to select and then fix the position of first roller mounting block 166. The width of first channel 108 is consequently adjusted.

Likewise, second channel rollers 134, 136 are mounted to main body 102 by means of a second roller mounting block 174 that is slidable within main body 102 in a direction parallel to that of the shafts 167 (FIG. 12) of rollers 134, 136. A set screw 176 that extends through a selected hole 178 of an adjustment plate 180 fixed to main body 102 allows to select and then fix the position of second roller mounting block 174. The width of second channel 110 is consequently adjusted.

The position of rollers 118, 120 and 134, 136 may further be adjusted relative to the first and second channel walls in a second direction, specifically for adjusting the size of the first and second lateral openings 126 and 142, respectively, for accommodating conveyor belt extremity sections 30, 32 of different sizes. More particularly, first channel rollers 118, 120 have shafts 165 (FIG. 12) that are movably mounted to main body 102, and more precisely that are slidable within slots 169, 171 of first roller mounting block 166, to allow movement of rollers 118, 120 in translation towards and away from a corresponding first channel wall, and more precisely towards and away from the first channel upper wall 112. First roller handles 177, 179 are attached to the first roller shafts on the opposite side of first roller mounting block 166 relative to rollers 118, 120, to allow the position of first channel rollers 118, 120 to be manually adjusted, as suggested by the arrows showing the vertical displacement of first roller handles 177, 179 in FIG. 7. Fastening tool 100 comprises biasing means in the form of coil springs 182 (FIG. 12) that are located within first roller mounting block 166 and that continuously bias rollers 118, 120 towards first channel upper wall 112. Consequently, the dimension of first lateral opening 126 can be increased by forcing rollers 118, 120 away from first channel upper wall 112 against the bias of the coil springs 182, and decreased by allowing rollers 118, 120 to move towards first channel upper wall 112 under the bias of the coil springs 182.

Likewise, second channel rollers 134, 136 have shafts 167 (FIG. 12) that are movably mounted to main body 102, and more precisely that are slidable within slots 173, 175 of second roller mounting block 174, to allow movement of rollers 134, 136 in translation towards and away from a corresponding second channel wall, and more precisely towards and away from the second channel lower wall 130. Second roller handles 181, 183 are attached to the first roller shafts 167 on the opposite side of second roller mounting block 174, to allow the position of second channel rollers 134, 136 to be manually adjusted, as suggested by the arrows showing the vertical displacement of second roller handles 181, 183 in FIG. 7. Fastening tool 100 comprises biasing means in the form of coil springs 184 (FIG. 12) that are located within second roller mounting block 174 and that continuously bias rollers 134, 136 towards second channel lower wall 130. Consequently, the dimension of second lateral opening 142 can be increased by forcing rollers 134, 136 away from second channel lower wall 130 against the bias of the coil springs 184, and decreased by allowing rollers 134, 136 to move towards second channel lower wall 130 under the bias of the coil springs 184.

Fastening tool 100 optionally comprises guide wheels 186, 188 and 190, 192 carried by main body 102 and each positioned in edgewise, spaced register with regards to a corresponding roller 118, 120, 134, 136 opposite first and second lateral openings 126, 142, respectively. First retaining members include guide wheels 186, 188 while second retaining members include guide wheels 190, 192. The first and second conveyor belt extremity sections 30, 32 consequently extend not only between rollers 118, 120 and 134, 136 and first channel upper wall 112 and second channel lower wall 130, but also between rollers 118, 120 and 134, 136 and guide wheels 186, 188 and 190, 192 to be guided therebetween. Guide wheels 186, 188, 190, 192 cooperate with rollers 118, 120, 134, 136 to reduce the overall friction between fastening tool 100 and conveyor belt extremity sections 30, 32 as fastening tool is moved along conveyor belt extremity sections 30, 32 to fasten them and help guide the conveyor belt extremity sections 30, 32 towards the upstream and the downstream ends 104, 106 thereof. In one embodiment (now shown), guide wheels could in fact be additional spring-mounted rollers similar to rollers 118, 120, 134, 136 and the conveyor belt extremity sections 30, 32 could be sandwiched between rollers 118, 120, 134, 136 and these additional rollers. In another embodiment (now shown), fastening tool 100 could have no guide wheels 186, 188, 190, 192 and the conveyor belt extremity sections 30, 32 could slide along first channel upper wall 112 and second channel lower wall 130 as they are engaged by the spring-mounted rollers 118, 120, 134, 136.

Fastening tool 100 comprises a tapered leader plate 194 located at the upstream end 104 of main body 102. Leader plate 194 juts frontwardly away from main body 102.

In use, first and second conveyor loop fasteners 34, 36 will be longitudinally inserted in respective first and second channels 108, 110 of fastening tool 100 with first extremities 34a, 36a located beyond channels 108, 110, 144 on the downstream end side 106 and with second extremities 34b, 36b located beyond channels 108, 110 on the upstream end side 104. Then, a few loops 38, 40 of the conveyor loop fasteners' first extremities 34a, 34b will be manually fastened before the fastening tool 100 is moved back until drums 146, 148 engage this assembled loop portion 38, 40.

Handle 158 is then grasped to move fastening tool 100 forward as suggested by an arrow in FIGS. 8-11 to force first and second conveyor loop fasteners 34, 36 to move into first and second channels 108, 110 and from there into third channels 144 where drums 146, 148 will fasten conveyor loop fasteners 34, 36 as detailed hereinafter.

First and second channels 108, 110 are offset vertically, or in other words (without reference to a vertical direction) in a direction that is perpendicular to a plane extending between first channel and first lateral opening 126 or between second channel 110 and second lateral opening 142. First and second channels 108, 110 thus converge in superimposed manner towards third channel 144 which allows first and second conveyor loop fasteners 34, 36 to be fastened by applying one over the other orthogonally relative to first and second conveyor belt extremity sections 30, 32: drums 146, 148 will gradually force the head portions 46, 48 of conveyor loop fasteners 34, 36 between adjacent loops 38, 40 of the opposing conveyor loop fastener 34, 36 in third channel 144, as fastening tool 100 moves forward.

Leader plate 194 will help guide first and second conveyor loop fasteners 34, 36 into their respective first and second channels 108, 110 as fastening tool 100 moves forward.

Guiding first and second conveyor loop fasteners 34, 36 through first and second channels 108, 110 serves at least two purposes: (1) to properly guide first and second conveyor loop fasteners 34, 36 towards third channel 144 in superimposed fashion; and (2) to retain conveyor loop fasteners 34, 36 against the tension that is exerted by the conveyor belt. On this second point, the first and second loop retaining members thus each comprise loop retaining members in the form of the rollers 118, 120, 134, 136 that are located adjacent to first and second lateral openings 126, 142 specifically for preventing the movement of the first and second conveyor loop fastener out through first and second lateral openings 126, 142, respectively, thus keeping them aligned to converge towards third channel 144. Generally, the first and second loop retaining members comprise first and second C-shaped channel walls (including the lower, upper and side walls) and opposed first and second rollers 118, 120, 134, 136 that are respectively located peripherally about first and second channels 108, 110 to circumscribe and define the first and second channels 108, 110. Although the channel walls helps limit undesirable movement away from channels 108, 110, it is the rollers 118, 120, 134, 136 that counter the tension from the conveyor belt and that will limit the movement of first and second conveyor loop fasteners 34, 36 out through first and second lateral openings 126, 142, respectively. It is noted that the coil springs 182, 184 will act to force rollers 118, 120, 134, 136 over and against the conveyor belt extremity sections 30, 32 to ensure that rollers 118, 120, 134, 136 abut against the side of conveyor loop fasteners 34, 36 near their attachment to conveyor belt extremity sections 30, 32 to prevent conveyor loop fasteners 34, 36 from moving outwardly through lateral openings 126, 142.

The combination of the first and second channel lower, upper and side walls with the rollers ensures that any movement of first and second conveyor loop fasteners 34, 36 orthogonally away from the first and second longitudinal axes will be limited to the space within the first and second channels 108, 110. If the area within channels 108, 110 is essentially the same size as that of the loops 38, 40, then the first and second conveyor loop fasteners 34, 36 will effectively be prevented from any orthogonal movement relative to their respective longitudinal axes. However, if the area within channels 108, 110 is slightly larger than the size of loops 38, 40, then a play might exist between loops 38, 40 and first and second channels 108, 110. This play, that will exist if fastening tool is used with conveyor loop fasteners of different sizes, may be countered by adjusting fastening tool 100 to the size of first and second conveyor loop fasteners: the width of channels 108, 110 may be reduced by sliding roller mounting blocks 166, 174 to move first channel rollers 118, 120 towards first channel side wall 116 and second channel rollers 134, 136 towards second channel side wall 132 thereby reducing the width of first and second channels 108, 110; and although the height of first and second channels 108, 110 cannot be adjusted, the spring-loaded rollers 118, 120, 134, 136 will force first and second conveyor loop fasteners 34, 36 towards the first channel upper wall 112 and the second channel lower wall 130, respectively. The combination of the adjustment of the width of first and second channels 108, 110 and the spring-loaded rollers, together with the adjustment of the spacing between drums 146, 148, allow significant flexibility in using fastening tool 100 with conveyor loop fasteners and conveyor belt extremity sections of varying sizes.

Additionally, preventing movement out through the first and second lateral openings 126, 142 with the rollers 118, 120, 134, 136 allows tension in the conveyor belt extremity sections to be reduced at the drums 146, 148 where the fastening of the conveyor loop fasteners will actually occur. This will allow the first and second conveyor loop fasteners 34, 36 to be attached to each other without requiring any other tension reducers, such as another temporary attachment between first and second conveyor belt extremity sections 30, 32 as with prior art devices.

Figure 14:
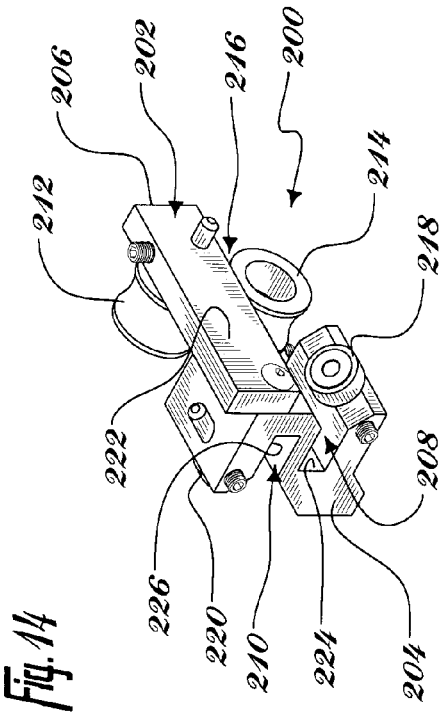
FIG. 14 is a perspective view taken from the front, top and left side of the conveyor fastening tool of FIG. 13.
Figure 13:
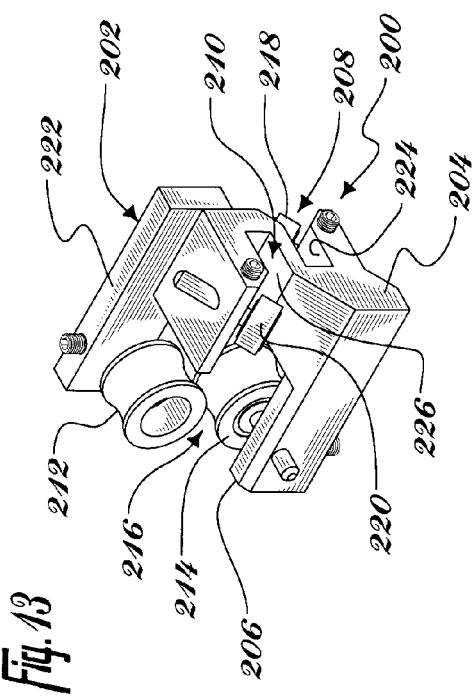
FIG. 13 is a perspective view taken from the front, top and right side of a conveyor fastening tool according to a second embodiment.
Figure 15:
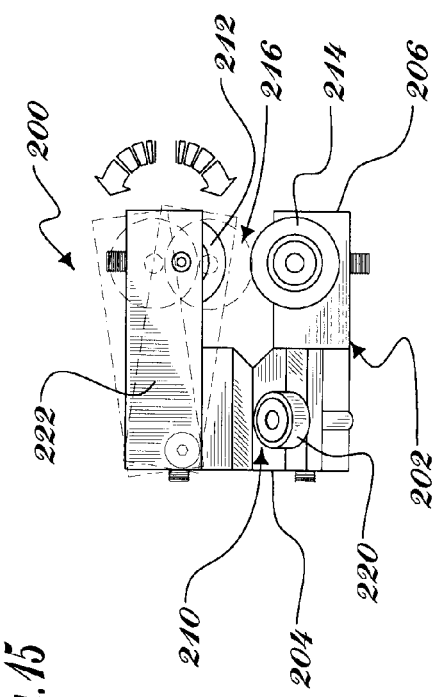
FIG. 15 is a left side elevation of the conveyor fastening tool of FIG. 13, further suggesting in dotted lines the pivotal displacement of one of the conveyor loop fastening drums.

FIGS. 13-15 show another embodiment of a fastening tool 200 according to the present invention that works in a similar way than fastening tool 100 of the first embodiment. Fastening tool 200 comprises a main body 202 with upstream and downstream ends 204, 206 and first and second channels 208, 210 wherein the first and second conveyor loop fasteners will pass. Drums 212, 214 are located at the downstream end 206 to fasten the conveyor loop fasteners, forming a third channel 216 where first and second channels 208, 210 converge. One drum 212 is mounted to a pivotable drum support arm 222 that can pivot relative to main body 202 to allow the spacing between drums 212, 214 to be adjusted (see FIG. 15). Rollers 218, 220 are installed on main body 202 to circumscribe channels 208, 210 with first and second C-shaped channel walls 224, 226. Lateral openings are defined between rollers 218, 220 and first and second channel walls 224, 226 to allow the conveyor belt extremity sections to extend out of channels 208, 210. First and second channel walls 224, 226 and rollers 218, 220 will limit movement of the first and second conveyor loop fasteners orthogonally away from the first and second channel longitudinal axes, and to prevent movement of the first and second conveyor loop fasteners out through the lateral openings. The position of rollers 218, 220 may be adjusted by sliding them in main body 202 and setting their position with set screws, to accommodate conveyor belt extremity sections of different thicknesses and conveyor loop fasteners of different sizes.

The fastening tool embodiment 200 of FIGS. 13-15 is similar to that of FIGS. 4-12, although the first and second rollers 218, 220 are disposed generally radially relative to the first and second longitudinal axes, respectively, and will edgewisely roll on the first and second conveyor loop fasteners while at least partly tangentially engaging the first and second conveyor belt extremity sections, respectively. In the embodiment shown in FIGS. 4-12, on the other hand, first and second rollers 118, 120, 134, 136 are disposed generally tangentially relative to the first and second longitudinal axes, respectively, for rolling on the first and second conveyor belt extremity sections 30, 32 that extend through the first and second lateral openings 126, 142 while tangentially retaining the first and second conveyor loop fasteners within the first and second channels 108, 110, respectively.

It is also envisioned, according to another embodiment (not shown) of the present invention, to have loop retaining members located near the lateral openings that are wall portions of the main body instead of rollers. These wall portions would still retain the first and second conveyor loop fasteners within the first and second channels, and the conveyor belt extremity sections and the first and second conveyor loop fasteners would slide along these wall portions instead of the rollers rolling on the conveyor belt extremity sections.

The invention claimed is:

1. A conveyor locking clip assembly comprising:
first and second conveyor locking clips for releasably interlocking first and second conveyor loop fasteners, each of said first and second locking clips comprise:
first and second rigid arms for respective engagement in corresponding interdigitized loops of said first and second conveyor loop fasteners, said first conveyor locking clip configured to engage two or more interlocking loops of said interlocking first and second conveyor loop fasteners at one end of a conveyor belt section, said second conveyor locking clip configured to engage two or more interlocking loops of said interlocking first and second conveyor loop fasteners at an opposing end of said conveyor belt section, each of said first and second locking clips further comprise a bridge rigidly linking said first and second arms and studs radially protruding from said first and second arms for engagement of said studs in-between loops of a corresponding one of said first and second conveyor loop fasteners.

2. A conveyor locking clip as defined in claim 1, wherein said bridge and said arms form a U-shaped locking clip.

3. A conveyor locking clip as defined in claim 2, wherein said bridge is arched.

4. A conveyor locking clip assembly for releasably interlocking first and second conveyor loop fasteners, said locking clip assembly comprising:
first and second conveyor locking clips, each of said first and second locking clips comprising:
first and second rigid arms for respective engagement in corresponding interdigitized loops of said first and second conveyor loop fasteners that are located at registering extremities of said first and second conveyor loop fasteners, said locking clip further comprising a bridge rigidly linking said first and second arms and studs radially protruding from said first and second arms for engagement of said studs in-between loops of a corresponding one of said first and second conveyor loop fasteners;
wherein said studs are equally spaced on each of said first and second arms, but are asymmetrically disposed on said first arm relative to those on said second arm.

5. A method of releasably interlocking first and second conveyor loop fasteners with first and second conveyor locking clips each comprising first and second rigid arms and a bridge rigidly linking said first and second arms, each of said first and second conveyor loop fasteners comprising a number of loops linked to a respective one of first and second conveyor belt extremity sections, with each loop of said first and second conveyor loop fasteners having a flat head portion located opposite an attachment edge of the conveyor belt extremity section to which said loop is attached, said method comprising:

fastening through interdigitation engagement the loops of said first and second loop fasteners including inserting the flat head portions of loops of said first conveyor loop fastener between loops of said second conveyor loop fastener and inserting the flat head portions of loops of said second conveyor loop fastener between loops of said first conveyor loop fastener;
releasably inserting said first arm of said first locking clip in said loops of a first extremity of said first conveyor loop fastener and said second arm of said first locking clip in said loops of a first extremity of said second conveyor loop fastener, with said first extremities of said first and second conveyor loop fasteners registering with each other;
releasably inserting said first arm of said second locking clip in said loops of a second extremity of said first conveyor loop fastener and said second arm of said second locking clip in said loops of a second extremity of said second conveyor loop fastener, with said second extremities of said first and second conveyor loop fasteners registering with each other;
wherein said first and second conveyor loop fasteners are releasably interlocked at said first extremities by said first locking clip and at said second extremities by said second locking clip.

6. A method as defined in claim 5, wherein the loops of said first and second conveyor loop fasteners are interlinked to form a continuous helical band.

7. A method as defined in claim 5, wherein the step of releasably inserting said first arm of said locking clip in said loops of said first extremity of said first conveyor loop fastener and said second arm of said locking clip in said loops of said first extremity of said second conveyor loop fastener comprises inserting said first arm of said locking clip between said flat head portions of said loops of said second conveyor loop fastener and said first conveyor belt extremity section and inserting said second arm of said locking clip between said flat head portions of said loops of said first conveyor loop fastener and said second conveyor belt extremity section.

8. A method as defined in claim 5, wherein said first and second arms are equipped with studs and the step of releasably inserting said first arm of said locking clip in said loops of said first extremity of said first conveyor loop fastener and said second arm of said locking clip in said loops of said first extremity of said second conveyor loop fastener also comprises engaging said studs in-between loops of a corresponding one of said first and second conveyor loop fasteners.

9. A method as defined in claim 5, wherein the step of releasably inserting said first arm of said locking clip in said loops of said first extremity of said first conveyor loop fastener and said second arm of said locking clip in said loops of said first extremity of said second conveyor loop fastener includes said bridge remaining outside of the loops of said first and second loop fasteners at said first extremities of said first and second conveyor loop fasteners.

10. A method as defined in claim 5, wherein the loops of said first and second conveyor loop fasteners are rings individually attached to said conveyor belt extremity sections.

11. A method of releasably interlocking first and second conveyor loop fasteners, each of the first and second conveyor loop fasteners located at opposing ends of conveyor belt sections, with conveyor locking clips, each conveyor locking clip comprising first and second rigid arms and a bridge rigidly linking said first and second arms, said first and second arms being equipped with studs, each of said first and second conveyor loop fasteners comprising two or more loops linked to a respective one of first and second conveyor belt extremity sections, said method comprising:

fastening through interdigitation engagement the loops of said first and second loop fasteners;

releasably inserting, at a first end of said conveyor belt section, said first arm of a first locking clip in said loops of a first extremity of a said first conveyor loop fastener and said second arm of said first locking clip in said loops of first extremity of said second conveyor loop fastener including engaging said studs in-between loops of a corresponding one of said first and second conveyor loop fasteners, with said first extremities of said first and second conveyor loop fasteners registering with each other;

releasably inserting, at a second end of said conveyor belt section, said first arm of a second locking clip in said loops of a first extremity of said first conveyor loop fastener and said second arm of said second locking clip in said loops of a first extremity of said second conveyor loop fastener including engaging said studs in-between loops of a corresponding one of said first and second conveyor loop fasteners, with said first extremities of said first and second conveyor loop fasteners registering with each other;

wherein each of said first and second conveyor loop fasteners are releasably locked at said first extremities and wherein said studs protrude radially from said first and second arms of said first and second locking clips.

12. A conveyor belt and locking clip assemblies, comprising:

a conveyor belt having first and second extremities;

first and second loop fasteners attached to said conveyor belt first and second extremities, said first and second loop fasteners fastened to each other through interdigitation of loops forming said first and second loop fasteners; and first and second spaced apart conveyor locking clips each comprising first and second rigid arms and a bridge rigidly linking said first and second arms, said first arm of said first locking clip engaging two or more of said loops of a first extremity of said first loop fastener and said second arm of said first locking clip engaging two or more of said loops of a first extremity of said second loop fastener, and said first arm of said second locking clip engaging two or more of said loops of a second extremity of said first loop fastener and said second arm of said second locking clip engaging two or more of said loops of a second extremity of said second loop fastener.

\* \* \* \* \*